Aug. 3, 1965    O. L. MARTIN    3,198,549
FIFTH WHEEL COUPLING DEVICE
Filed Feb. 2, 1962    2 Sheets-Sheet 1

INVENTOR.
OTTO L. MARTIN.
BY *Martina L. Honeman*
ATTORNEY.

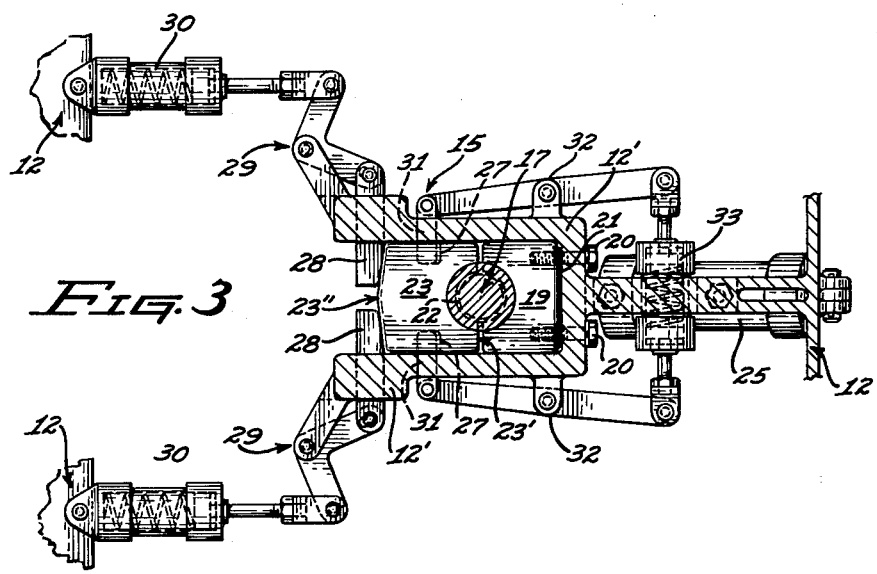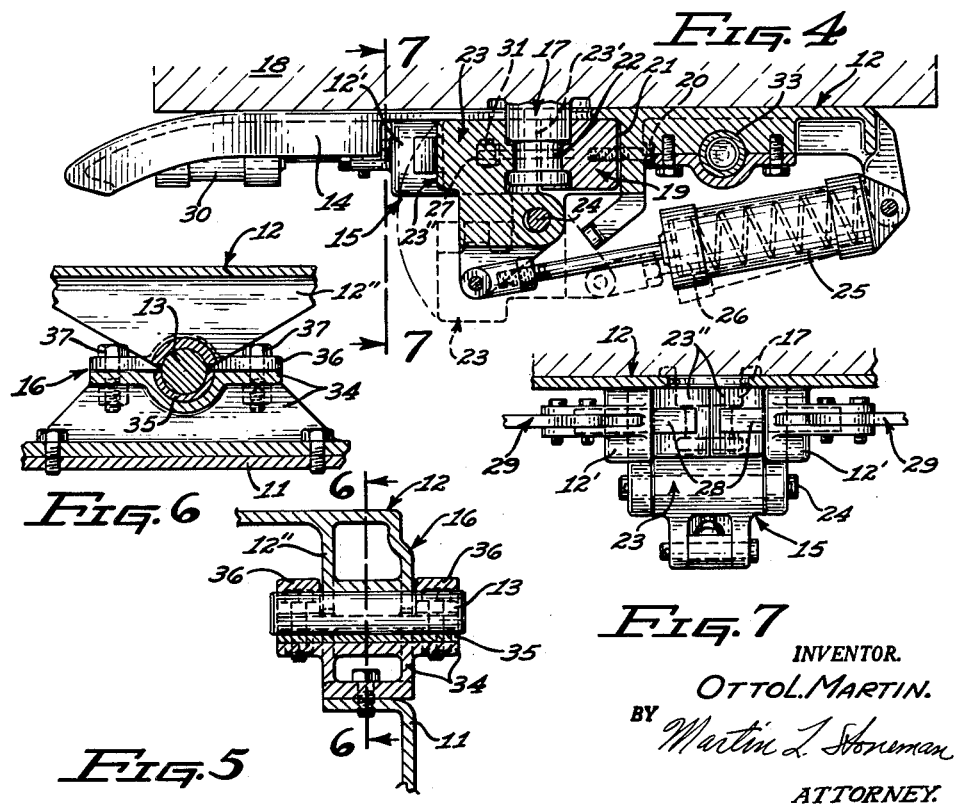

United States Patent Office 3,198,549
Patented Aug. 3, 1965

3,198,549
FIFTH WHEEL COUPLING DEVICE
Otto L. Martin, 6638 N. 19th Ave., Phoenix, Ariz.
Filed Feb. 2, 1962, Ser. No. 170,635
8 Claims. (Cl. 280—432)

This invention relates to fifth-wheel coupling devices. More particularly, it relates to improved fifth-wheel coupling devices wherein the coupling action is safe, easy of operation, and positive.

In the trucking industry, what is known as a "fifth-wheel" connection is normally used in connecting a tractor to a trailer. The fifth-wheel is generally on the rear portion of the tractor and comprises a tiltable, horizontal platform or turntable having therein a female socket connection, basically a hole or opening in said platform. The trailer has a kingpin extending down vertically from the front portion of said trailer. In connecting up, the tractor is backed into the trailer so that the kingpin enters the guideway and then into the socket of the fifth-wheel. Various latching means are generally provided to hold the kingpin in place during road conditions.

In the past, it has been a major problem to maintain a tight connection between the male and female fifth-wheel coupling members with usage of the coupling and the continuing wear which results therefrom. Such wear normally loosens the fifth-wheel connection, often to the point where the connection becomes unsafe. And this looseness sometimes results in an accidental uncoupling between the tractor and the trailer, often with catastrophic results.

It is a principal object of the present invention to provide a fifth-wheel coupling device which ensures a safe and tight connection. An additional object of the present invention is to provide such a connection which is automatic in its operation.

A further object is to provide a fifth-wheel coupling device not only providing a tight connection but having an auxiliary safety feature even upon failure of said tight connection. Additionally, it is an object to provide an improved fifth-wheel platform construction.

A further object of importance consists in the novel construction and arrangement of the latching mechanism for securing the connecting members in their cooperative locked positions. Also it is an object to provide an improved tiltable mounting for fifth-wheels.

In the drawings:

FIGURE 3 is an expanded detail view of the latching mechanism through the section 3—3 of FIGURE 2;

FIGURE 4 is a cross-sectional view of the fifth-wheel of the present invention through the section 4——4 of FIGURE 1;

FIGURE 5 is a sectional view through the section 5—5 of FIGURE 1;

FIGURE 6 is a sectional view through the section 6—6 of FIGURE 5, showing the incorporation of the tilting feature into the fifth-wheel of the present invention;

FIGURE 7 is a front sectional view of the fifth-wheel of the present invention through the section 7—7 of FIGURE 4.

Figure 1:
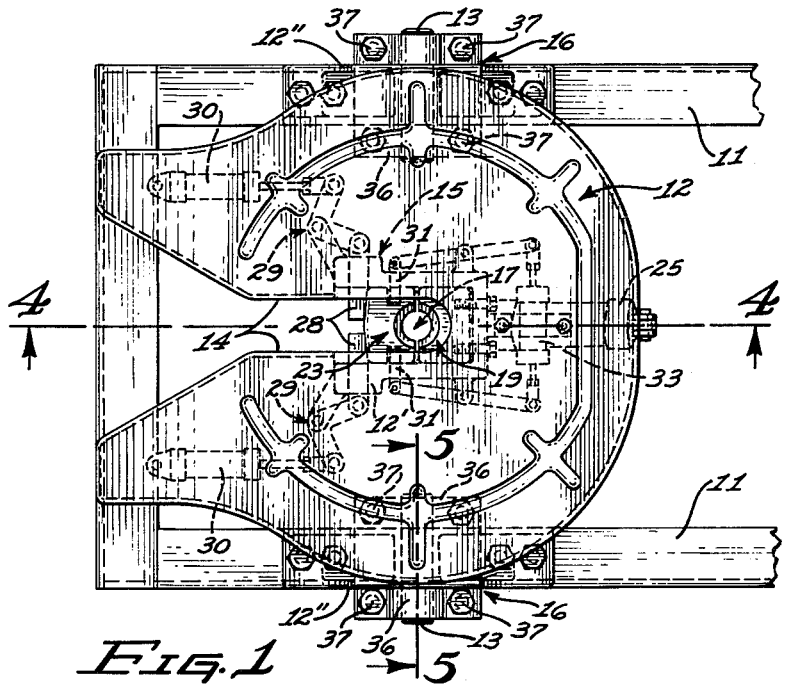
FIGURE 1 is a top view of the fifth-wheel of the present invention arranged upon a truck frame.
Figure 2:
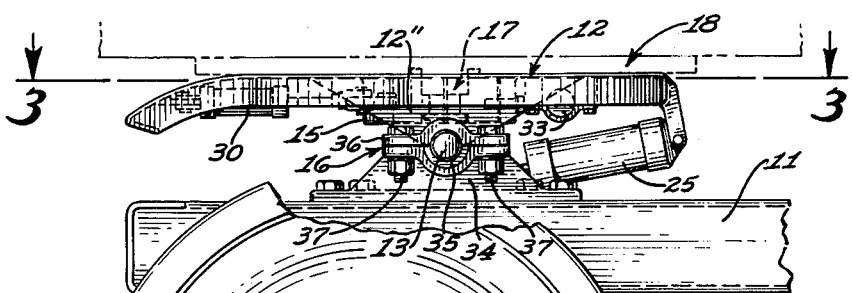
FIGURE 2 is a side view of the fifth-wheel coupling member as shown in FIGURE 1.

With reference to FIGURES 1 and 2, the fifth-wheel of the present invention is mounted on a tractor frame 11. The table 12 of the fifth-wheel is rotatably mounted on the frame 11 through a rocker pin 13. The table 12 includes at the rear portion thereof a guideway or notched portion 14 having opposite sides and a rearward opening suitable to receive a trailer kingpin. Mounted under the table 12 is the novel latching assembly 15 of the present invention, which assembly is better shown in detail in FIGURES 3, 4, and 7. The details of the rocker mounting 16 between table 12 and tractor frame 11 is shown in detail in FIGURES 5 and 6.

FIGURES 1, 2, and 3 show the latching assembly of the present invention in its locked position. When in such locked position, as illustrated by FIGURE 2, the kingpin 17 mounted to the bottom of the trailer 18 extends downwardly through the notched portion 14 as shown, and into the latching assembly 15.

In the hook-up operation between tractor and trailer, the rear end of the tractor, having mounted on it the fifth-wheel assembly, is backed under the front portion of the trailer, which has mounted thereon the kingpin 17. The tractor is backed up in such a manner so as to guide the kingpin 17 into the notched portion 14 of the table 12, until in its final position the kingpin 17 comes to rest as far into the notched portion 14 as it will go, usually somewhere about in the center of table 12. In this position, the table 12 supports the trailer 18. The latching assembly 15 is then placed in its locked position to securely hold the kingpin 17, as is more particularly hereinafter pointed out.

With reference to FIGURES 3, 4, and 7, the latching assembly 15 of the present invention will now be described in detail. A front fixed latch 19 is securely mounted to the table 12 at the forward end of the notched portion 14 by means of the bolts 20. A shim, or shims, 21, of thin gauge steel, tin or other suitable material, may be inserted between the table 12 and front latch 19, as shown, to suitably position the front latch 19 with increasing wear. The kingpin 17 normally has a recessed portion 22, and the configuration of the front latch 19 is such as to mate with the configuration of the kingpin 17 and thus form the forward end of the guideway 14. The rear moveable latch 23 is shown in its closed position. The dotted lines in FIGURE 4 show the position of the rear latch mechanism in its open position. The rear latch 23 swings up into position when it is locked, and its movement is hinged on pin 24. Sufficient looseness and play is provided in the seating of pin 24 to allow the forward-backward movement of rear latch 23 caused by the tapered-pin mechanism hereinafter explained.

In operation, then, the tractor is moved into position under the trailer so that kingpin 17 extends into table 12 and up tightly against front latch 19. Then rear latch 23 is raised into position to tightly grasp kingpin 17. The configuration of rear latch 23 is also such as to mate with and hold securely kingpin 17. A spring-loaded air cylinder 25 of a type known in the art may be used as the power means to swing rear latch 23 up into position. In such a spring-loaded air cylinder 25, the piston thereof, 26, is normally in its extended position by reason of the spring pressure from the spring-loaded air cylinder 25. Air pressure is used to pull the piston back into cylinder 25 in a well-known manner. Such a provision is a wise safety precaution, in that, even upon failure of air pressure, the rear latch 23 will remain in position due to the spring pressure.

Denoting the side of rear latch 23 which grasps the kingpin 17 as the front side 23', and the oppoiste side as the rear side 23" of said rear latch 23, the rear side 23" of rear latch 23 has opposite tapered portions adjacent to the corresponding sides of the guideway 14 and extends furtherest rearward in the central portion of said rear side 23", as shown, with a straight taper in both directions all the way from the sides of the guideway 14 with the opposite side faces converging toward the rear opening of the guideway. The parallel sides of the rear latch 23, adjacent the sides of the notched portion 14, each have a hole 27 therein of rectangular cross-section located about midway along the parallel sides of the rear latch 23 between the kingpin 17 and the rear side 23" of the rear latch 23. The holes 27 and their function will be later described in detail.

Tapered pins 28 are provided to hold rear latch 23 tightly against kingpin 17, even as the various interlocking parts wear. The tapered pins 28 are longitudinally moveable through guide-holes in housing 12' and in their open position the tapered pins 28 are completely free of the notched portion 14 and withdrawn into the housing 12'. When the latching assembly 15 is in its locked position, the tapered pins 28 extend into the guideways or notched portion 14 laterally of the guideway and in their innermost positions have innermost ends in the guideway and bear against the tapered rear side 23" of the rear latch 23, the taper on pins 28 matching the taper on rear side 23", to effectively bear against and exert continuous pressure against the rear latch 23 as hereinafter provided.

Each tapered pin 28 may be connected through a bell crank 29 to a spring-loaded air cylinder 30 of the same general type as cylinder 25. Each air cylinder 30 is mounted to table 12. Thus, when each cylinder 30 is in its released position, the tapered pins 28 are withdrawn from notched portion 14 to allow kingpin 17 to become seated in position. During the seating of kingpin 17, of course, rear latch 23 is in its lower, open position. When the kingpin 17 has been seated against the front latch 19, and the rear latch 23 has been raised into position, the air pressure in cylinders 30 may be released and the springs therein will force the tapered pins 28 into the notched portion 14, securely pressing or biasing said tapered pins 28 against the tapered rear side 23" of rear latch 23 to secure the kingpin 17 tightly.

Similarly, pins 31 are mounted in housing 12' to be longitudinally slideable therein, and in their withdrawn positions pins 31 are free of notched portion 14 so that kingpin 17 may make free entry. Bell crank 32 connects pins 31 with spring-loaded air cylinder 33. Cylinder 33 is a dual action cylinder of the same general type as cylinders 25 and 30. When the air pressure is released from cylinder 33, pins 31 are moved forward to extend into holes 27 in rear latch 23. The mechanism including pins 31 is provided as a precautionary feature to maintain the latching assembly 15, which holds kingpin 17, in a closed position, even in the event of failure of tapered pins 28. Holes 27 are large enough in the direction of movement of rear latch 23 so that pins 31 may be inserted in holes 27 even with the slightly varying positions that rear latch 23 assumes as the various parts wear and the tapered pins 28 push rear latch 23 tightly against kingpin 17.

FIGURES 5 and 6 illustrate in detail the rocker attachment 16 between table 12 and tractor frame 11. Each side of table 12 has a vertical portion 12" extending downwardly. Each such vertical portion 12" has a rocker-pin 13 securely connected thereto, as by welding. Each side of tractor frame 11 has connected thereto, as by bolting, a casting 34. Each casting 34 has at its upper portion a bushing 35 of semicircular cross-section secured to said casting 34, each said bushing 35 being adapted to receive a rocker-pin 13. Rocker-pins 13 have greater length than vertical portion 12" has width, and therefore each rocker-pin 13 extends beyond its vertical portion 12" and is adapted to be clamped to its casting 34. When each rocker-pin 13 is rested in its respective bushing 35, clamping members 36 are placed across the upper portions of rocker-pins 13 and bolted by bolts 37 to castings 34 to secure table 12 from being released upwardly from its rocker seating.

It is to be understood that the above teachings are illustrative in nature. Many modifications, alternatives, and variations of the present invention will be apparent to those skilled in the art from the teachings herein, and it is intended that all such modifications, alternatives, and variations fall within the scope of the present invention, limited only by the appended claims.

What is claimed is:

1. A fifth-wheel coupling device adapted to be mounted on a tractor and to receive the coupling pin member of a trailer comprising: a turntable having a guideway adapted to receive said coupling pin member; a latching assembly including one fixed latching member and one moveable latching member; means for maintaining said moveable latching member out of said guideway so that said coupling pin member may be brought into contact with said fixed latching member; means for bringing said moveable latching member into secure contact with said coupling pin member after said coupling pin member has been brought into contact with said fixed latching member; a first means for urging said moveable latching member against said coupling pin member, said means including a tapered surface contact; and a second means, including a pin member, for securing said moveable latching member in a locked position.

2. A fifth-wheel coupling device adapted to be mounted on a tractor and to receive a coupling pin member of a trailer comprising: a turntable having a guideway adapted to receive said pin member; a latching assembly in said guideway including a frontward fixed latching member and a rearward moveable latching member; automatic power means for maintaining said moveable latching member out of said guideway so that said coupling pin member may be brought into contact with said fixed latching member; automatic power means for bringing said moveable latching member into said guideway so that said coupling pin member may be held by said latching assembly; means for urging said moveable latching member against said coupling pin member, said means including a pair of tapered surfaces on said moveable latching member, and a pair of tapered pins adapted by compression means to be pushed forward to bear against said tapered surfaces; and means for inserting a second pair of pins into said moveable latching member to safely secure said moveable latching member in a locked position.

3. The fifth-wheel coupling device of claim 2 wherein the compression means comprises automatic power means.

4. A fifth-wheel coupling device adapted to be mounted on a tractor and to receive the coupling pin member of a trailer comprising: a turntable having a guideway adapted to receive said coupling pin member; a latching assembly including one fixed latching member and one moveable latching member; means for maintaining said moveable latching member out of said guideway so that said coupling pin member can be brought into contact with said fixed latching member; means for bringing said moveable latching member into secure contact with said coupling pin member after said coupling pin member has been brought into contact with said fixed latching member; means for urging said moveable latching member against said coupling pin member, said means including a pair of tapered surfaces on said moveable latching member and a pair of tapered pins adapted by compression means to be pushed forward to bear against said tapered surfaces; and means for inserting a second pair of pins into said moveable latching member to safely secure said moveable latching member in a locked position.

5. A fifth-wheel coupling device adapted to be mounted on a tractor and to receive a coupling pin member of a trailer comprising: a turntable having a guideway adapted to receive said pin member; a latching assembly in said guideway including a frontward fixed latching member and a rearward moveable latching member; means for maintaining said moveable latching member out of said guideway so that said coupling pin member may be brought into contact with said fixed latching member; means for bringing said moveable latching member into said guideway so that said coupling pin member may be held by said latching assembly; means for urging said moveable member against said coupling pin member, said means including a pair of tapered surfaces on said moveable latching member, and a pair of tapered pins adapted by compression means to be pushed forward to bear against said tapered surfaces; and means for inserting a second pair of pins into said moveable latching member to safely secure said moveable latching member in a locked position.

6. A fifth-wheel coupling device adapted to be mounted on a tractor and to receive the coupling pin member of a trailer, said device comprising: a table having a guideway, said guideway having sides, a rearward opening and a closed forward end for said guideway to receive said coupling pin member; a moveable latching member having opposed portions respectively on opposite sides of said moveable latching member and adapted to be contacted for biasing said moveable latching member toward said coupling pin member; means for maintaining said moveable latching member out of said guideway so that said coupling pin member may be brought into contact with said closed forward end of said guideway; means for bringing said moveable latching member into secure contact with said coupling pin member after said coupling pin member has been brought into contact with said closed forward end of said guideway; and means for urging said moveable latching member against said coupling pin member, said means including a pair of pins mounted on opposite sides of said guideway to be moved to innermost positions and bias said moveable latching member toward said coupling pin member, said pair of pins having surfaces correspondingly to contact said opposed portions of said moveable latching member for said moveable latching member to be biased and said pair of pins in said innermost positions having innermost ends in said guideway, and compression means for said pair of pins to be biased having said surfaces thereof in contact with said portions of said moveable latching member.

7. A fifth-wheel coupling device as set forth in claim 6, wherein said portions of said moveable latching member have surfaces which converge toward each other and which converge toward said rearward opening of the guideway after said coupling pin member has been brought into contact with said closed forward end of said guideway; and said surfaces of said pair of pins converge toward said rearward opening of said guideway for engaging said surfaces of said moveable latching member.

8. A fifth-wheel coupling device adapted to be mounted on a tractor and to receive the coupling pin member of a trailer, said device comprising: a table having a guideway, said guideway having sides, a rearward opening and a closed forward end for said guideway to receive said coupling pin member; a moveable latching member having a first portion adapted to be contacted for biasing said moveable latching member toward said coupling pin member and having a second portion adapted to be engaged for said moveable latching member to be locked in said guideway; means for maintaining said moveable latching member out of said guideway so that said coupling pin member may be brought into contact with said closed forward end of said guideway; means for bringing said moveable latching member into secure contact with said coupling pin member after said coupling pin member has been brought into contact with said closed forward end of said guideway; means for urging said moveable latching member against said coupling pin member, said means including a pin mounted to be moved into engagement with said moveable latching member and bias said moveable latching member toward said coupling pin member, said pin having a surface to contact said first portion of said moveable latching member for said moveable latching member to be biased, and said means for urging said moveable latching member further including compression means for said pin to be biased having said surface thereof in contact with said portion of said moveable latching member; and the device further including locking means comprising a locking element mounted to be moved into engagement with said second portion of said moveable latching member for locking said moveable latching member in said guideway.

References Cited by the Examiner
UNITED STATES PATENTS

| 1,491,185 | 4/24 | Baits | 280—439 |
| 2,431,779 | 12/47 | Stevens | 280—437 |
| 2,667,364 | 1/54 | Colpo | 280—438 |
| 2,815,224 | 12/57 | Waters | 280—432 |
| 2,833,560 | 5/58 | Cochrane | 280—437 |
| 2,838,326 | 6/58 | Georgi | 280—434 |
| 2,853,312 | 9/58 | Fuschi | 280—432 |

FOREIGN PATENTS 722,786  1/55  Great Britain.

A. HARRY LEVY, *Primary Examiner.*
LEO FRIAGLIA, *Examiner.*